United States Patent [19]
Kubokawa et al.

[11] Patent Number: 5,270,833
[45] Date of Patent: Dec. 14, 1993

[54] FACSIMILE COMMUNICATION METHOD AND SYSTEM FOR TRANSMITTING RECEIVED AND MEMORIZED DATA IN A MEMORY OF ONE FACSIMILE UNIT TO ANOTHER FACSIMILE UNIT AND A FACSIMILE APPARATUS PROVIDED THEREOF

[76] Inventors: Makoto Kubokawa, No. 38-4, Naka, Ookute-cho, Toyoake-shi, Aichi-ken; Eiji Taki, No. 1-37, Hakuryu-cho, Mizuho-ku, Nagoya-shi, Aichi-ken; Yutaka Nonomura, No. 342-3, Higashiichibayashiki, Higashimachi Iwakura-shi, Aichi-ken; Kazunobu Asai, No. 5-24, Meizen-cho, Mizuho-ku, Nagoya-shi, Aichi-ken; Naoki Igushi, No. 147, Aza Machikita, Ooaza Moriyama, Moriyama-ku, Nagoya-shi, Aichi-ken, all of Japan

[21] Appl. No.: 676,529

[22] Filed: Mar. 28, 1991

[30] Foreign Application Priority Data

May 30, 1990 [JP] Japan .................. 2-140738
Jun. 22, 1990 [JP] Japan .................. 2-165058

[51] Int. Cl.$^5$ .............................. H04N 1/00
[52] U.S. Cl. ........................ 358/434; 358/444; 358/476; 358/404; 379/100
[58] Field of Search ............ 358/434, 404, 407, 435, 358/468, 472, 476, 402, 403, 436, 439, 440, 444, ; 379/100

[56] References Cited

U.S. PATENT DOCUMENTS

| | | | |
|---|---|---|---|
| 4,091,424 | 5/1978 | Widergren | 379/100 |
| 4,994,926 | 2/1991 | Gordon et al. | 379/100 |
| 5,095,373 | 3/1992 | Hisano | 358/402 |

FOREIGN PATENT DOCUMENTS

| | | | |
|---|---|---|---|
| 3733650 | 4/1988 | Fed. Rep. of Germany | 358/403 |
| 0003267 | 1/1985 | Japan | 379/100 |
| 0096945 | 5/1985 | Japan | 358/407 |

Primary Examiner—Richard E. Chilcot, Jr.
Assistant Examiner—K. Negash
Attorney, Agent, or Firm—Oliff & Berridge

[57] ABSTRACT

A called facsimile unit stores image data received from a calling facsimile unit in its memory. When communication is established between another calling facsimile unit and the called facsimile unit designates the received image data which has been received and stored in its memory as image data to be sent to the another calling facsimile unit, the called facsimile unit transmits the received image data to the another calling facsimile unit.

32 Claims, 9 Drawing Sheets

FACSIMILE COMMUNICATION METHOD AND SYSTEM FOR TRANSMITTING RECEIVED AND MEMORIZED DATA IN A MEMORY OF ONE FACSIMILE UNIT TO ANOTHER FACSIMILE UNIT AND A FACSIMILE APPARATUS PROVIDED THEREOF

BACKGROUND OF THE INVENTION

1. Field of the Invention

This invention relates to a facsimile communication method and system for transmitting received and memorized data in a memory of one facsimile unit to another facsimile unit, and more particularly to a facsimile communication method and system for transmitting received and memorized data in a memory of one facsimile unit to another facsimile unit in a polling mode.

2. Discussion of the Related Art

Conventional facsimile communication involves transmitting image data by a sending facsimile unit and receiving the transmitted image data by a receiving facsimile unit. The receiving facsimile unit stores the received image data in a memory and prints the received image data on a recording paper. The receiving facsimile unit, when operating in the mode of storing image data, stores received image data and thereafter prints the image data in response to a key entry or the like.

Conventionally, only the receiving facsimile unit, which has received image data and stored the image data, can print the image data. When a person who is addressed as the receiver of a facsimile communication cannot access the receiving facsimile unit, the person cannot receive the printed, transmitted image data.

Another conventional method of facsimile communication is the polling communication scheme.

The polling communication scheme provides facsimile communication between a calling facsimile unit and a called facsimile unit over a telephone line. In polling communication, the called facsimile unit (on which the original facsimile document is located) reads the image of the original and sends its image data to the calling facsimile unit, which then stores the received data.

For the polling communication scheme to be carried out, the following two conditions (a),(b) described below must be met.

(a) An original to be sent is set on the called facsimile unit.

(b) The calling and called facsimile units are both operating in the polling communication mode.

Accordingly, the polling communication is possible only when an operator accesses the called facsimile unit to set an original therein.

Another conventional facsimile communication scheme is the confidential facsimile communication scheme as described in Japanese Laid-Open Patent No. 54-53812.

In this facsimile communication scheme, image data which is received in a status of confidential communication is stored temporarily in the memory of the receiving facsimile unit. For the receiving facsimile unit to record the confidential image data, it must receive from the operator a password which is consistent with the password sent from the sending facsimile unit. Conventionally, only a receiving facsimile unit having the capability to receive data in a status of confidential communication can record the received data.

When a person who is addressed as the receiver of a facsimile communication cannot access the receiving facsimile unit for any reason, the person cannot operate the unit to print the received information. In this case, a possible alternative enabling the person to receive the information is to provide the confidential reception code to a third person near the receiving facsimile unit so that the received confidential message can be printed. This alternative, however, is not always appropriate, since the intended receiving person is still not immediately provided a print of the received message immediately.

OBJECTS AND SUMMARY OF THE INVENTION

It is therefore an object of the present invention to overcome the above-described drawbacks and disadvantages by providing a facsimile communication method and system capable of transmitting the received image data, which has been received and stored in the memory provided in a receiving facsimile unit, to another facsimile unit and to provide a facsimile apparatus capable of performing such a function.

Another object of the present invention is to provide a facsimile communication method and system with a function in which image data which has been received and stored in a called facsimile unit is designated as image data to be transmitted from the called facsimile unit in the polling communication mode so that the image data can be received by a facsimile unit other than the called facsimile unit and to provide a facsimile apparatus capable of performing this function.

A further object of the present invention is to provide a confidential facsimile communication method and system in which confidential image data which has been received and stored in a receiving facsimile unit is designated as image data to be transmitted from the receiving facsimile unit in the polling communication mode, and a facsimile unit other than the receiving facsimile unit makes a polling call to obtain the image data, and to provide a facsimile apparatus capable of performing this function.

To attain this and other objects, according to the present invention, there is provided a facsimile communication method comprising the steps of; using a first coupled unit to establish a communication over a communication line between a first calling facsimile unit and a called facsimile unit which is called by the first calling facsimile unit; transmitting image data sent from the first calling facsimile unit to the called facsimile unit over the communication line after the communication has been established by the coupled unit; storing the received data in a storage unit provided in the called facsimile unit; designating the received image data stored in the storage unit as image data to be transmitted; using a second coupled unit to establish a communication line between the called facsimile unit and a second calling facsimile unit; and transmitting the designated image data stored in the storage unit to the second calling facsimile unit after the communication has been established by the second coupling unit.

According to this arrangement of the invention, the called facsimile unit stores received image data in its memory. When communication is established between a calling facsimile unit and the called facsimile unit and the called facsimile unit designates the received image data which has been received and stored in its memory as image data to be sent to another calling facsimile unit, the called facsimile unit transmits the received image data to the another calling facsimile unit.

BRIEF DESCRIPTION OF THE DRAWINGS

The foregoing and other objects, features and advantages of the present invention will become more apparent by reading the following detailed description of presently preferred embodiments of the present invention, when considered in connection with the accompanying drawings, in which.

DETAILED DESCRIPTION OF THE PREFERRED EMBODIMENTS

Hereinafter, one preferred embodiment of the present invention will be described with reference to FIGS. 1-5.

Figure 1:
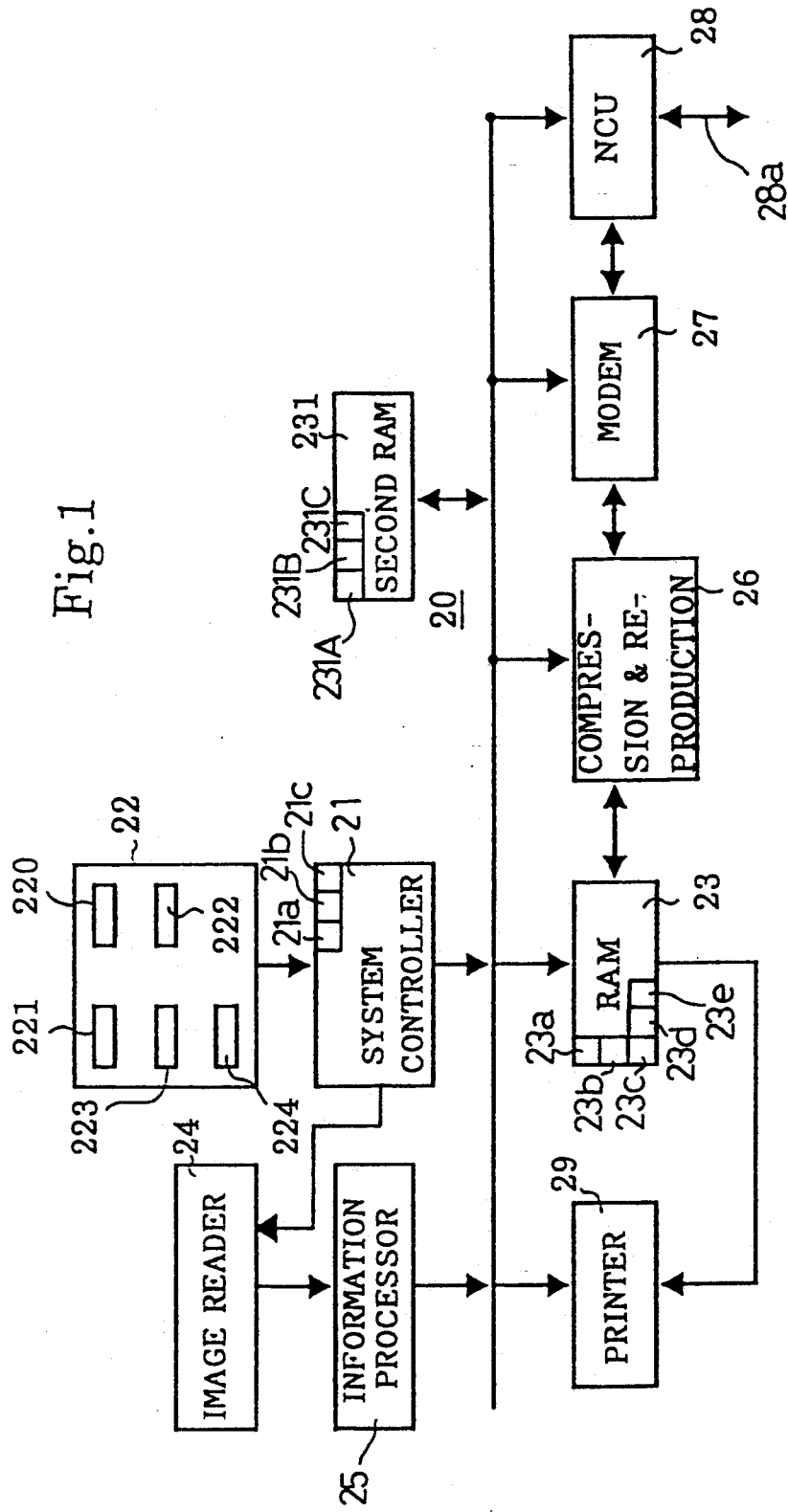
FIG. 1 is a block diagram of the facsimile system based on a first embodiment of the present invention.

In FIG. 1, a facsimile unit 20 includes a system controller 21 which controls the overall facsimile unit 20.

The facsimile unit 20 further includes a keyboard 22 for entering data to the facsimile unit 20. Output signals from the keyboard 22 are fed to the system controller 21. The keyboard 22 comprises dial keys 220 including a dial key set for entering a dial number, a password setting key 221 used for entering a password, a start key 222 for initiating the communication, a polling specification key 223 which specifies polling communication and designates a calling party and called party of the polling communication, and a memory reception command key 224 which directs received data to be stored in a compressed form in a second RAM 231 which will be explained later.

The system controller 21 comprises a CPU 21a which controls the overall system controller 21, a ROM 21b which stores the operational program of the CPU 21a, and an I/O interface 21c which implements the signal transaction between the CPU 21a and external devices.

The system controller 21 is connected with a RAM 23, which has a work area 23a for storing data used to control the facsimile unit 20. The RAM 23 further has a polling area 23b for storing the polling flags indicative of the polling communication mode activated by the polling command key 223, and indicative of the calling party.

The RAM 23 further has a memory reception flag area 23c for storing the memory flag indicative of the memory reception mode specified by the memory reception key 224. The RAM 23 further has an image information storing area 23d for temporarily storing image data which as been made binary by an information processor 25, which will be explained later. The RAM 23 further has a password storing area 23e for storing a password used for polling communication.

An image reader 24 is connected to the system controller 21. The image reader 24 reads image information in a transmitted original under control of the system controller 21. An information processor 25 is connected to the system controller 21. The information processor 25 forms image information read by the image reader 24 into binary data under control of the system controller 21.

A data compression and reproduction portion 26 is connected to the system controller 21 and operates during transmission to compress image information and deliver the information to a modem 27. The compression of image information enables a reduction in the amount of transmitted data, thus resulting in a shortening of transmitting time. Data compression and reproduction portion 26 operates during reception to expand compressed data received from the modem 27 to restore the original image data in the transmitted original and deliver the data to the image information storing area 23d of the RAM 23, all under control of the system controller 21.

A network control unit (NCU) 28, which constitutes a coupling means, is connected to the system controller 21 and performs the calling operation for calling another facsimile unit 20, and performs the receiving operation for receiving a call from another facsimile unit, all through a communication line 28a. Network control unit 28 further implements the transmission and reception of compressed data to/from other facsimile units 20 over the communication line 28a, all under control of the system controller 21.

A second RAM 231 is connected to the system controller 21. The second RAM 231 stores compressed image data which is received by way of the communication line 28a under control of the system controller 21. The second RAM 231 is partitioned into multiple (three in this embodiment) areas 231A, 231B and 231C for storing three batches of compressed image data received. A printer 29 is connected to the system controller 21 and prints image data of an original read out of the image information storing area 23d, under control of the system controller 21.

The facsimile unit 20 is controlled by its system controller 21 for transmission to operate the information reader 24 to read image information of an original to be sent, store the image information in the image information storing area 23d of the RAM 23, read the image data out of the RAM, operate the data compression and reproduction portion 26 to compress the data, operate the modem 27 to modulate the data, and transmit the data by way of the network control unit (NCU) 28. The facsimile unit 20 is controlled by its system controller 21 for reception to receive compressed image data sent over the telephone line, operate the modem 27 to demodulate the data and store the data in the second RAM 231 by way of the network control unit (NCU) 28 and the modem 27, transfer the compressed image data from the second RAM 231 to data compression and reproduction portion 26 to expand the image data thereby to restore the original data, store the restored image data in the image information storing area 23d, read the image data out of the image information storing area 23d, and operate the printer 29 to print the image data to reproduce the original.

The performance of the facsimile apparatus based on the foregoing embodiment of this invention will be explained with reference to FIG. 2 through FIG. 5.

Figure 2:
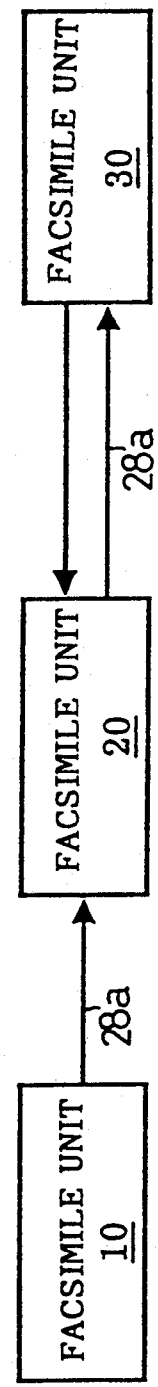
FIG. 2 is a block diagram showing the communication which takes place among a plurality of facsimile units.

As shown in FIG. 2, the facsimile unit 20 in the memory reception mode, which is set by the memory reception command key 224, stores batches of compressed image data sent from another facsimile unit 10 over the communication line 28a, in the areas 231A, 231B and 231C of the second RAM 231.

The facsimile unit 20, which has been established as the called party of polling communication by the command of the polling command key 224, is called by another facsimile unit 30. Once the facsimile unit 20 is placed in the memory reception mode and is established as the called party of polling communication, it transmits the compressed image data stored in the areas 231A, 231B and 231C to the facsimile unit 30. The facsimile units 10 and 30 have the same structure as the facsimile unit 20, and the explanation thereof will not be repeated.

Figure 3:
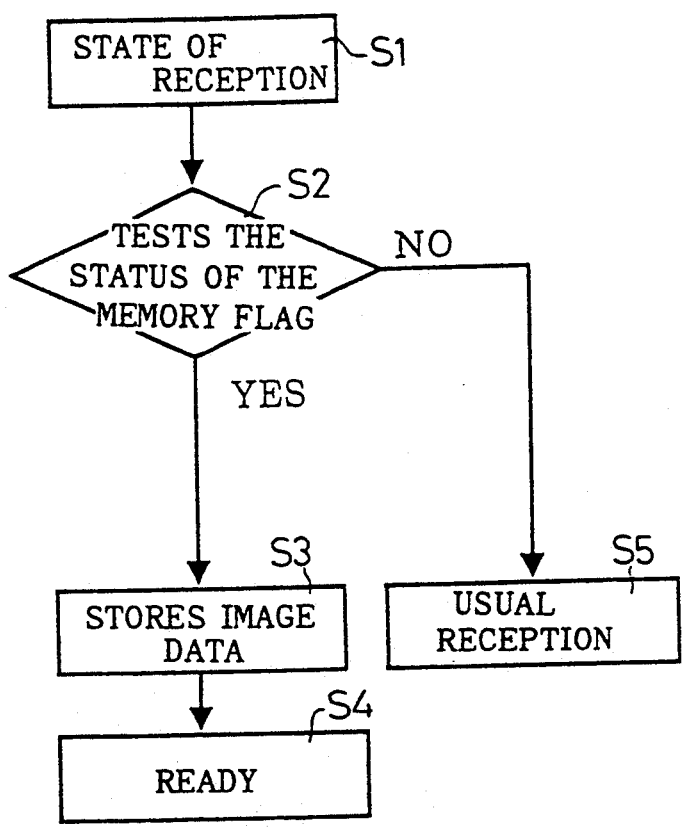
FIG. 3 is a flowchart showing the operation of the above facsimile system in receiving image data and storing the data in the memory.

The operation of the facsimile unit 20 in the memory reception mode will be explained with reference to the flowchart of FIG. 3.

The facsimile unit 20, in being called by a calling facsimile unit 10 through the system controller 21 of facsimile unit 20, enters the state of reception (step S1). The system controller 21 of facsimile unit 20 tests the status of the memory flag in the memory reception flag area 23c (step S2).

In response to a positive test result of the step S2 (memory reception is ready), the system controller 21 of facsimile unit 20 stores the received compressed image data in one of areas 231A, 231B and 231C of the second RAM 231 (step S3). The user operates the polling command key 223 to establish polling communication with the called unit for polling communication. The system controller 21 of facsimile unit 20 sets the polling flag in the polling area 23b, and the compressed image data stored in the area 231A, 231B or 231C of the second RAM 231 is ready to be transmitted in polling communication (step S4).

The system controller 21 of facsimile unit 20 implements the usual reception on detecting that memory reception is not specified (step S5). In this case, compressed image data sent over the telephone line is stored in one of the areas 231A, 231B and 231C of the second RAM 231 by way of the network control unit (NCU) 28 and the modem 27. The compressed image data by way of the network control unit (NCU) 28 is transferred immediately to the modem 27, in which the data is expanded for restoration by the data compression and reproduction portion 26. The restored data is stored in the image information storing area 23d of the RAM 23, from which the image data is read out and printed by the printer 29 to reproduce the original.

It is also possible for the system controller 21 to establish the polling mode of operation of the called party unit prior to the memory reception.

In this case, the system controller 21 may be designed to select one of a polling communication mode and a normal facsimile receiving mode, by means of operation of the polling command key 223. When establishing the polling communication mode, the system controller 21 in the called facsimile unit 20 stores compressed image data sent over the communication line in RAM 23 as it is.

Accordingly, the system controller 21 may be designed to select only compressed image data, which has been received following the establishment of the polling communication mode, as image data to be transmitted during polling communication, so that the image data among received compressed image data is transmitted during polling communication, or the image data is not transmitted, on the basis of operation of the polling command key 223 depending on the user's preference.

Next, the operation of polling communication will be explained with reference to FIGS. 4 and 5.

Facsimile unit 20 receives input of a password through operation of a password setting key 221.

Figure 4:
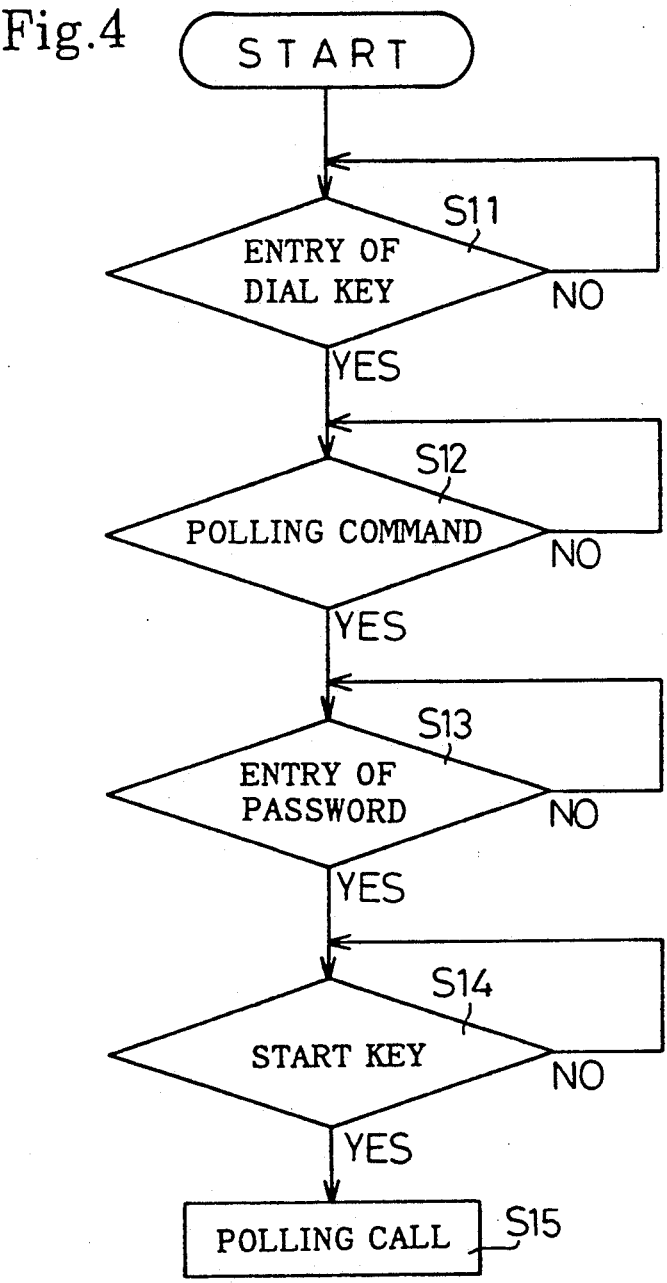
FIG. 4 is a flowchart showing the operation of the above facsimile system in carrying out a polling communication as a calling facsimile unit.

As shown in FIG. 4, the system controller 21 of facsimile unit 30 is in a wait status to await the entry of the facsimile number of the facsimile unit 20 through the operation of the dial key 220 (step S11).

The system controller 21 of facsimile unit 30 waits for the establishment of the polling communication mode of the calling unit through the operation of the polling command key 223 of the facsimile unit 30 (step S12). The system controller 21 of the facsimile unit 30 waits for the entry of a password, the password being entered on the facsimile unit 30, through the operation of the password setting key 221 of facsimile unit 30 (step S13). The system controller 21 of the facsimile unit 30 waits for the turn on operation of the start key 222 (step S14). In response to positive responses of the key entry test steps S11, S12, S13 and S14, the facsimile unit 30 makes a polling call by transmitting the polling command and password through its system controller 21 (step S15).

Figure 5:
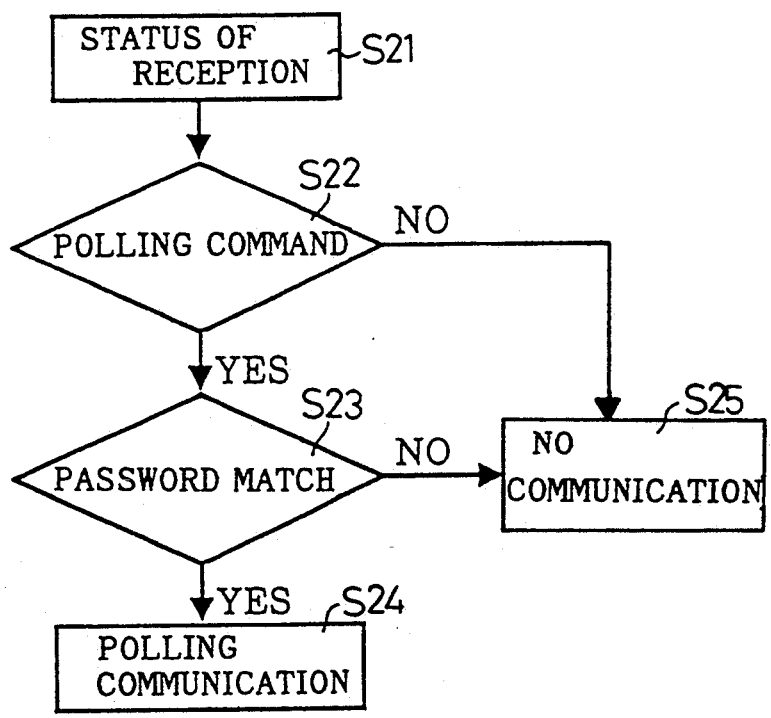
FIG. 5 is a flowchart showing the operation of the above facsimile system in carrying out a polling communication as a called facsimile unit.
Figure 6:
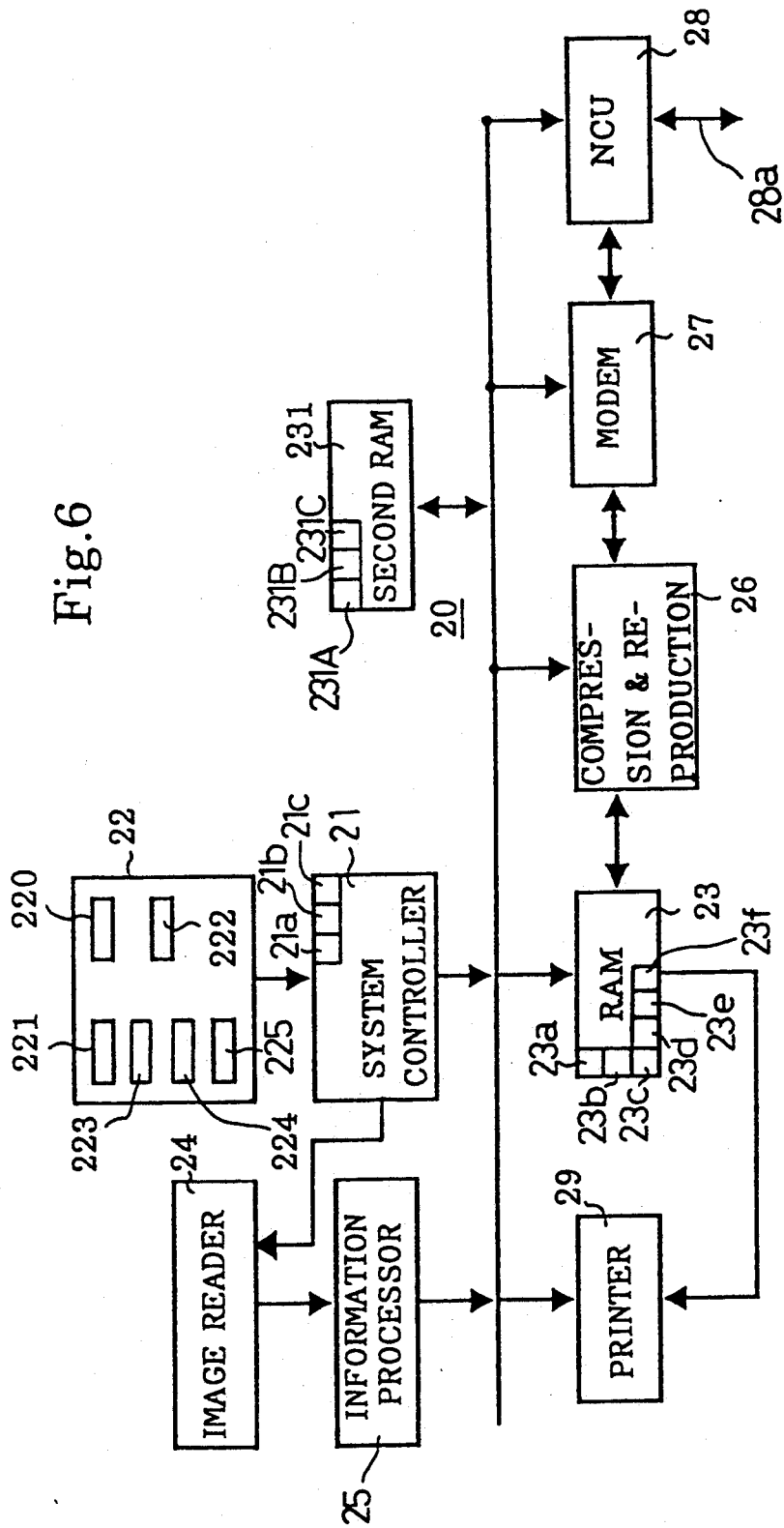
FIG. 6 is a block diagram of the facsimile system based on a second embodiment of the present invention.

At this time, the facsimile unit 20, which becomes the polling called party, is in a status of reception as shown in FIG. 5 (step S21). The system controller 21 of the facsimile unit 20 determines that polling communication is to be performed by recognizing the polling command (step S22). When polling communication is recognized, the system controller 21 of the facsimile unit 20 verifies whether a password sent from the facsimile unit 30 matches the one which is registered in the password storing area 23e of the RAM 23 of facsimile unit 20 (step S23).

In the case of positive responses of both steps S22 and S23, i.e., valid password and polling communication ready, the facsimile unit 20 carries out polling communication through the system controller 21 by sending the original stored in the second RAM 231 of facsimile unit 20 to the facsimile unit 30 (step S24). If the step S22 or S23 provides a negative test result, the facsimile unit 20 does not perform the polling communication (step S25).

In summary, the facsimile unit 20 selects compressed image data stored in the second RAM 231 as image data to be sent from the called party of polling communication, and, by having a polling call made by another facsimile unit 30, facsimile unit 20 transfers the compressed image data to the another facsimile unit 30.

Since compressed image data stored in the second RAM 231 is sent in response to a polling call, the second RAM 231 is allowed to have a smaller memory capacity for image data. In addition, compressed image data is intact when sent. A shorter transmission time is therefore required as compared with the case of sending uncompressed image data stored in the RAM 23.

Next, the second embodiment of the present invention will be described with reference to FIG. 6 through FIG. 9.

This embodiment is identical to the previous embodiment except for a portion of the keyboard 22 and a portion of the operational program of the system controller 21, and the explanation will not be repeated for the common portions which are referred to by the same reference symbols.

The facsimile unit 20 has its keyboard 22 provided with a confidentiality specification key 225 used to specify the confidential communication. The RAM 23 has a work area 23a, a polling flag area 23b, a memory reception flag area 23c and an information storing area 23d, as in the previous embodiment. The RAM 23 further has a confidential flag area 23f for storing a confidential flag indicative of the confidential communication specified by the confidentiality specification key 225, and a password storing area 23e for storing a password used in confidential, polling communication.

The performance of this embodiment arranged as described above will be explained with reference to FIG. 2 and FIGS. 6-9.

As shown in FIG. 2, the facsimile unit 20 receives a confidential message from the facsimile unit 10 and is called by the facsimile unit 30 for polling communication. The facsimile units 10 and 30 have the same structure as the facsimile unit 20, and the explanation thereof will not be repeated.

Figure 7:
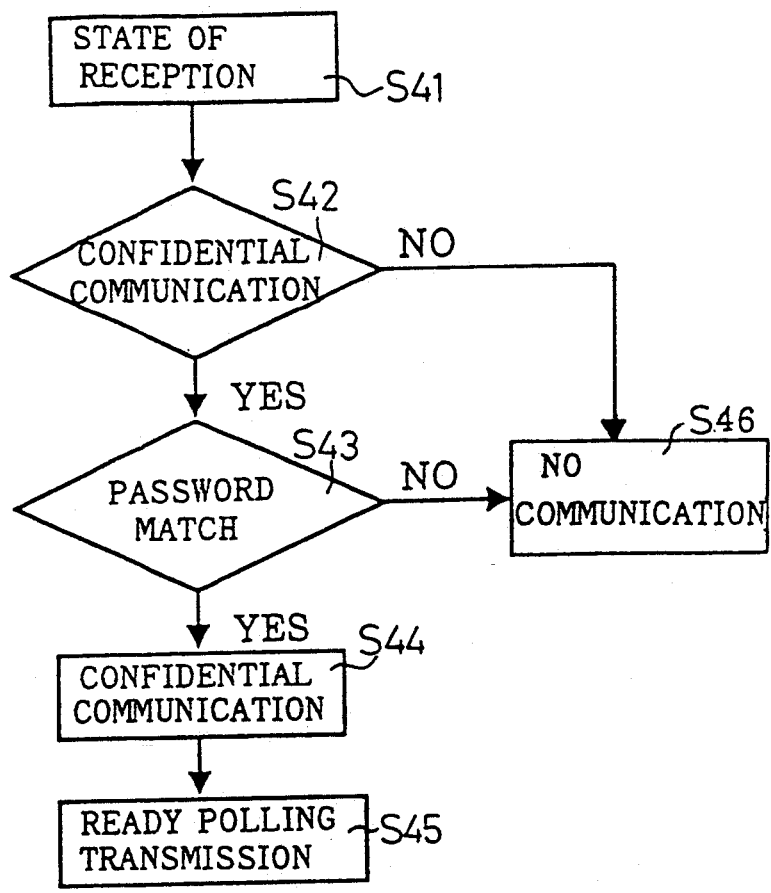
FIG. 7 is a flowchart showing the operation of the facsimile system of the second embodiment in receiving confidential image data and storing the data in the memory.

The operation of the facsimile unit 20 in confidential communication will be explained with reference to the flowchart of FIG. 7.

The facsimile unit 20, by being called through the facsimile unit 10, enters the state of reception (step S41). The system controller 21 tests whether or not the confidential flag (carried by the non-standard function setting signal (NSS) indicative of the confidential communication) is detected in the confidential flag area 23f (step S42). If the step S42 yields a positive test result, i.e., confidential communication, the system controller 21 verifies whether the password sent from the facsimile unit 10 matches the one which is registered in the password storage area of facsimile unit 20 (step S43).

After approving the password, the system controller 21 implements the confidential communication and stores the confidential flag in the confidential flag area 23f and stores the received image data in one of the areas 231A, 231B and 231C of the second RAM 231 of facsimile unit 20 (step S44). The system controller 21 establishes the polling mode of operation of the called party of polling in response to operation of the polling specification key 223, so that the facsimile unit is ready to have a polling transmission of a confidential original once the polling flag is set in the polling area 23b (step S45). If the step S42 or S43 provides a negative result, the facsimile unit 20 does not establish the polling communication of the confidential original (step S46).

It is also possible for the system controller 21 to establish the identity of the called party of polling prior to the confidential reception. In this case, the system controller 21 of facsimile unit 20 may be designed to select one of a polling communication mode and a normal facsimile receiving mode, by means of operation of the polling command key. When establishing the polling communication mode, the system controller 21 in facsimile unit 20 stores compressed image data as it is.

Accordingly, the system controller 21 may be designed to select only compressed confidential image data, which has been received following the establishment of the polling mode at the called party, as image data to be transmitted during polling communication, so that the image data among received compressed image data is transmitted during polling communication or, in the alternative, the image data is not transmitted, depending on the user's preference. It is also possible for the system controller 21 to establish the identity of the called polling party prior to the confidential reception.

Figure 8:
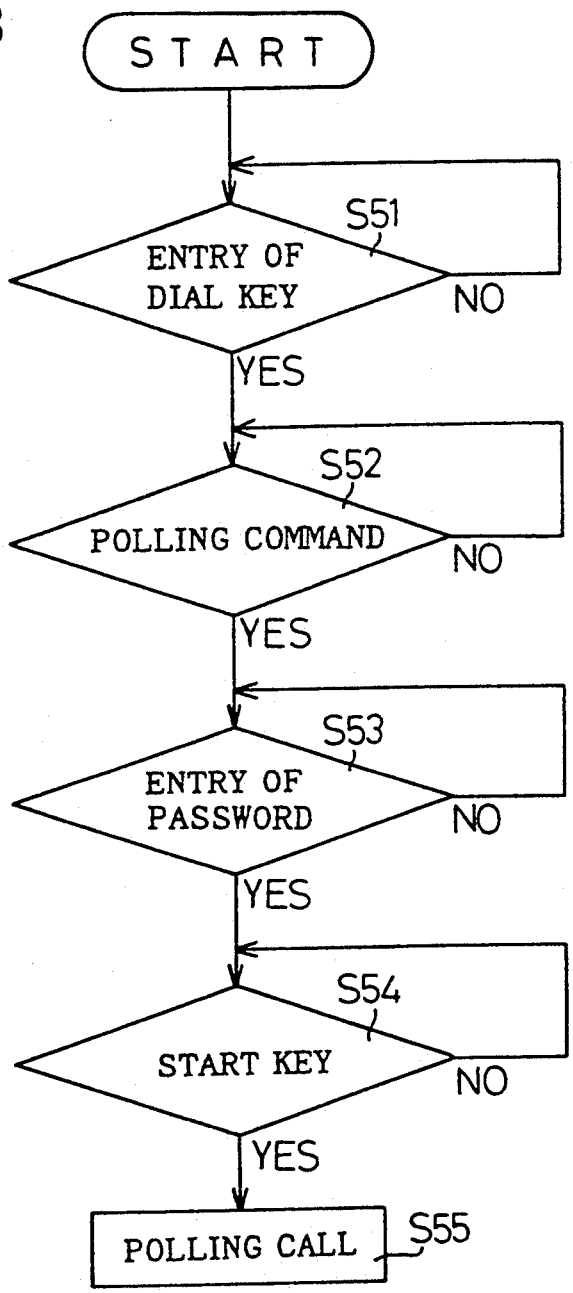
FIG. 8 is a flowchart showing the operation of the facsimile system of the second embodiment in carrying out a polling communication as a calling facsimile unit.

Next, the operation of polling communication will be explained with reference to FIGS. 8 and 9.

The system controller 21 of facsimile unit 30 is in a wait status for the entry of the facsimile number of the facsimile unit 20 through the operation of the dial key of facsimile unit 30 (step S51). The system controller 21 of the facsimile unit 30 waits for the establishment of the identity of the calling party of polling (step S52). The system controller 21 of the facsimile unit 30 waits for the entry of the same password as is set on the facsimile unit 20 (step S53). The facsimile unit 30 waits for the turn on operation to be initiated by operation of the start key 222 (step S54). In response to positive responses of the key entry test steps S51, S52, S53 and S54, the facsimile unit 30 makes a polling call by transmitting the polling command and password (step S55).

Figure 9:
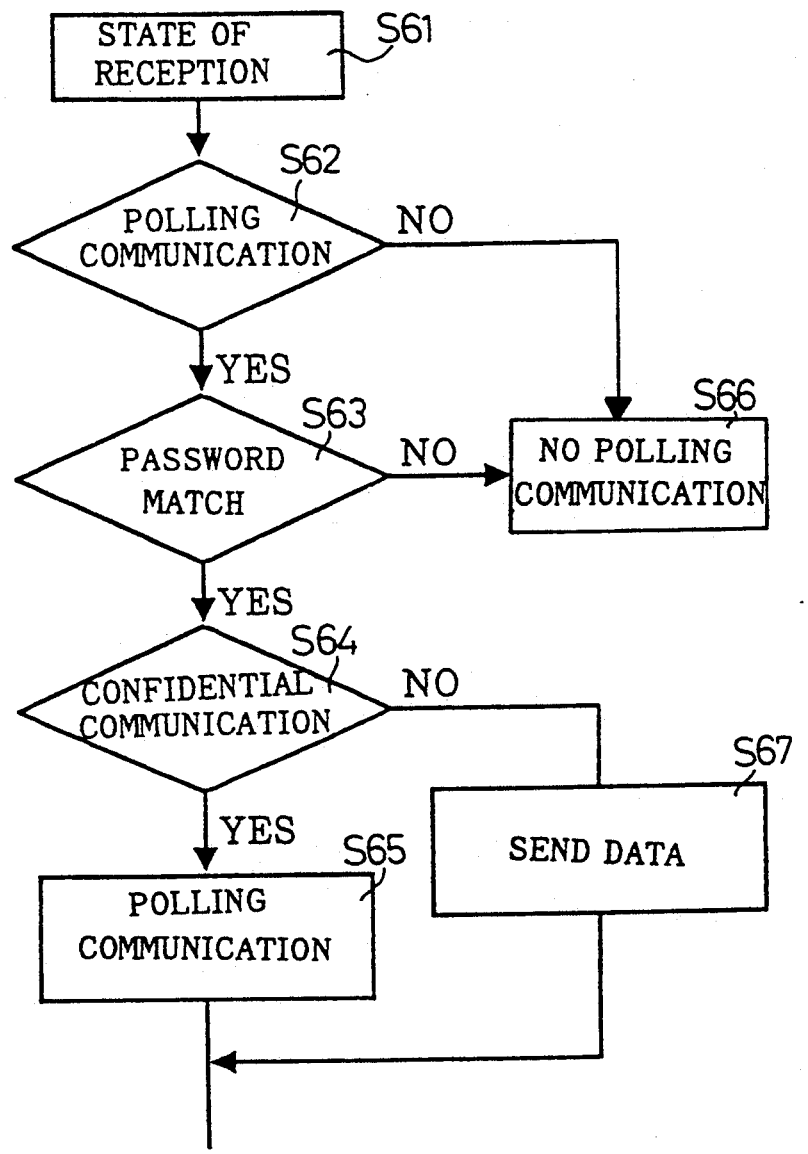
FIG. 9 is a flowchart showing the operation of the facsimile system of the second embodiment in carrying out a polling communication as a called facsimile unit.

At this time, the facsimile unit 20, which becomes the polling called party, is in a status of reception as shown in FIG. 9 (step S61). The system controller 21 determines that polling communication is to be performed by recognizing the polling command (step S62). When polling communication is recognized, the system controller 21 of facsimile unit 20 verifies whether the password sent from the facsimile unit 30 matches the one which is registered in the password storing area 23c of the RAM 23 in the facsimile unit 20 (step S63). The system controller 21 of facsimile unit 20 tests whether the confidential flag has been set in the confidential flag area 23f and, if the confidential flag has been set, the facsimile unit 20 is ready to perform a confidential communication (step S64).

In the case of positive responses of the steps S62, S63 and S64, i.e., polling communication, valid password, confidential flag set in the confidential flag area 23f, and polling communication ready, the system controller 21 carries out a polling communication for the received confidential image data stored in the areas 231A, 231B and 231C of the second RAM 231 of facsimile unit 20 to the facsimile unit 30 (step S65). If the step S62 or S63 provides a negative result, the facsimile unit 20 does not perform the polling communication (step S66). In the case of positive responses of the steps S62 and S63 and a negative response of the step S64, i.e., polling communication, valid password, but confidential flag not set in the confidential flag area 23f, the system controller 21 of facsimile unit 20 reads image data out of the RAM 23 and sends it to the facsimile unit 30 by way of the data compression and reproduction portion 26, second RAM 231, modem 27 and NCU 28 (step S67).

Although in the foregoing embodiment the system controller 21 implements a polling transmission for image data stored in the area 231A, 231B or 231C in response to operation of both the polling flag indicative of the establishment of the polling communication mode and the memory flag indicative of the specification of memory reception in the respective flag areas, this operating mode may also be set through a single key operation.

As another alternative, the system controller 21 may be designed to select the areas 231A, 231B and 231C of the second RAM 231 based on their flag status so that image data stored in the area 231A, 231B or 231C is transmitted at polling communication, or the image data is not transmitted.

According to this embodiment of the confidential facsimile communication scheme, confidential compressed image data which has been received and stored in the second RAM 231 is designated as image data to be transmitted from the called party of polling, and, in response to a polling call from an facsimile unit, the compressed image data is read out of the second RAM 231 and sent to another calling facsimile unit.

Accordingly, the present invention enables the facsimile user to have a print of an original, which has been sent to, for example, the user's residence in his absence, by using another accessible facsimile unit.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A facsimile communication method for transmitting and receiving image data between a first calling facsimile unit, a called facsimile unit and a second calling facsimile unit comprising the steps of:
   electronically communicating between the first calling facsimile unit and the called facsimile unit which is called by the first calling facsimile unit;
   receiving image data sent from the first calling facsimile unit to the called facsimile unit after electronic communication has been established;
   storing the received image data in said called facsimile unit;
   designating the stored received image data as image data to be transmitted;
   electronically communicating between the called facsimile unit and the second calling facsimile unit; and
   transmitting the designated stored image data to the second calling facsimile unit after electronic communication has been established between the called facsimile unit and the second calling facsimile unit,
   wherein said designating is in a mode of polling communication,
   said method including designating said mode of polling communication by:
      setting the called facsimile unit in a mode of polling communication using a polling specification command key; and
      designating the called facsimile unit as a called party of polling communication.

2. The facsimile communication method as claimed in claim 1, further comprising separating the stored received image data into image data not to be transmitted and image data to be transmitted.

3. The facsimile communication method as claimed in claim 1, including compressing the designated stored image data.

4. The facsimile communication method as claimed in claim 1, including transmitting the stored image data only after the called facsimile unit receives and verifies a password sent from the second calling facsimile unit.

5. The facsimile communication method as claimed in claim 1, including dividing said image data into a plurality of memory areas, said memory areas storing image data for a plurality of communication events.

6. The facsimile communication method as claimed in claim 1, wherein said designating of the stored received image data is performed prior to said receiving of the image data sent from the first calling facsimile unit to the called facsimile unit.

7. The facsimile communication method as claimed in claim 1, wherein said transmitting is performed in response to a polling call from said second calling facsimile unit.

8. A facsimile communication method, comprising the steps of:
   electronically communicating between a first calling facsimile unit and a called facsimile unit which is called by said first calling facsimile unit;
   receiving image data sent from said first calling facsimile unit to said called facsimile unit after electronic communication has been established;
   storing the received data in said called facsimile unit;
   electronically communicating between the called facsimile unit and a second calling facsimile unit;
   verifying the validity of a password sent from the second calling facsimile unit after electronic communication has been established between the called facsimile unit and the second calling facsimile unit;
   designating at said called facsimile unit the stored received image data as image data to be transmitted after the password has been verified; and
   transmitting the designated stored image data to said second calling facsimile unit after the stored image data has been designated to be transmitted.

9. The facsimile communication method as claimed in claim 8, wherein said designating is in a mode of polling communication.

10. The facsimile communication method as claimed in claim 8, including compressing designated stored image data to be transmitted from the called facsimile unit.

11. The facsimile communication method as claimed in claim 8, including dividing said image data into a plurality of memory areas, said memory areas storing image data for a plurality of communication events.

12. The facsimile communication method as claimed in claim 8, wherein said designating of the stored received image data is performed prior to said receiving of the image data sent from the first calling facsimile unit to the called facsimile unit.

13. A facsimile communication system for transmitting and receiving image data between a first calling facsimile unit, a called facsimile unit and a second calling facsimile unit, comprising:
   first coupling means for establishing electronic communication between the first calling facsimile unit and the called facsimile unit which is called by said first calling facsimile unit;
   receiving means for receiving image data sent from the first calling facsimile unit to the called facsimile unit after electronic communication has been established by said first coupling means;

storing means for storing image data sent from the first calling facsimile unit to the called facsimile unit;

designating means for designating the received image data stored in said storage means as image data to be transmitted;

second coupling means for establishing electronic communication between the called facsimile unit and the second calling facsimile unit;

transmitting means for transmitting image data from said called facsimile unit to said second calling facsimile unit; and control means for controlling said transmitting means to transmit the designated image data stored in said storage means to the second calling facsimile unit after electronic communication has been established by said second coupling means, said control means controlling the transmitting means to transmit the image data stored in said storing means in a mode of polling communication, said called facsimile unit having a polling specification command key which is operated to set said mode of polling communication.

14. The facsimile communication system as claimed in claim 13, wherein said command key is operable only when the called facsimile unit is in a memory reception mode and is established to be a called party of polling communication.

15. The facsimile communication system as claimed in claim 14, wherein said transmitting means transmits said image data in response to a polling call from said second calling facsimile unit.

16. The facsimile communication system as claimed in claim 13, further comprising compressing means for compressing the received image data.

17. The facsimile communication system as claimed in claim 13, wherein said storage means separates image data stored therein into image data to be transmitted at polling communication and image data not to be transmitted.

18. The facsimile communication system as claimed in claim 13 further comprising compressing means for compressing the received image data and wherein said storage means designates the compressed image data stored in said storage means as image data to be transmitted from the called party of polling communication.

19. The facsimile communication system as claimed in claim 18, wherein said transmitting means transmits the compressed image data stored in said storage means in response to a polling call from said second calling facsimile unit.

20. The facsimile communication system as claimed in claim 13, further comprising compressing means for compressing the image data to be stored in said storage means.

21. The facsimile communication system as claimed in claim 13, wherein said storage means is divided into a plurality of memory areas, and said memory areas store image data for a plurality of communication events.

22. The facsimile communication apparatus as claimed in claim 13, wherein said transmitting means transmits the stored image data only after said called facsimile unit receives and verifies a password sent from the second calling facsimile unit.

23. The facsimile communication system as claimed in claim 13, wherein said receiving means receives said image data after said designating means designates said image data as image data to be transmitted.

24. A facsimile terminal for transmitting facsimile-transmitted image data to another facsimile apparatus, said terminal comprising:

coupling means for establishing electronic communication with another facsimile unit;

receiving means for receiving facsimile transmitted image data;

storage means for storing in a memory said received image data;

designating means provided in said terminal for designating the received image data stored in said memory as image data to be transmitted to another facsimile apparatus; and transmitting means for transmitting the designated stored image data to another facsimile apparatus.

25. The facsimile communication apparatus as claimed in claim 24, wherein said transmitting means transmits image data only after receipt and verification of a valid password.

26. The facsimile communication apparatus as claimed in claim 24, wherein said designating means includes confidential data designating means for designating said facsimile-transmitted image data as being confidential, said transmitting means transmitting said image data only after receipt and verification of a valid password.

27. The facsimile communication apparatus as claimed in claim 24, further comprising setting means for setting a ready-transmission mode, said designating means operating only after said setting means sets ready-transmission mode.

28. The facsimile terminal as claimed in claim 24, wherein said terminal includes detecting means for detecting a signal from another facsimile apparatus and wherein said transmitting means transmits said image data when said detecting means detects said signal.

29. The facsimile terminal as claimed in claim 24, wherein said transmitting means transmits said image data in response to a polling call from another facsimile apparatus.

30. The facsimile terminal as claimed in claim 24, wherein said transmitting means transmits said image data in a mode of polling communication, said terminal including a polling specification command key which is operated to set said mode of polling communication.

31. The facsimile terminal as claimed in claim 30, wherein said command key is operable only when the terminal is in a memory reception mode and is established to be a called party of polling communication.

32. The facsimile terminal as claimed in claim 24, wherein said designating means designates a mode of polling communication, said designating means being actuated to set said terminal in a memory reception mode and designating said terminal as a called party of polling communication.

* * * * *